US009784592B2

(12) United States Patent
Gupta et al.

(10) Patent No.: US 9,784,592 B2
(45) Date of Patent: Oct. 10, 2017

(54) TURN PREDICTIONS

(71) Applicant: Honda Motor Co., Ltd., Tokyo (JP)

(72) Inventors: Rakesh Gupta, Mountain View, CA (US); Bo Tang, Kingston, RI (US); Salman Anwar Khokhar, Orlando, FL (US)

(73) Assignee: Honda Motor Co., Ltd., Tokyo (JP)

( * ) Notice: Subject to any disclaimer, the term of this patent is extended or adjusted under 35 U.S.C. 154(b) by 33 days.

(21) Appl. No.: 14/801,904

(22) Filed: Jul. 17, 2015

(65) Prior Publication Data

US 2017/0016734 A1 Jan. 19, 2017

(51) Int. Cl.
*G01C 21/00* (2006.01)
*G01C 21/36* (2006.01)
*B60W 30/00* (2006.01)

(52) U.S. Cl.
CPC ......... *G01C 21/3697* (2013.01); *B60W 30/00* (2013.01)

(58) Field of Classification Search
CPC ..................................................... G01C 21/34
See application file for complete search history.

(56) References Cited

U.S. PATENT DOCUMENTS 6,256,577 B1 * 7/2001 Graunke ........... G01C 21/3694 701/117
8,457,827 B1 * 6/2013 Ferguson ................. G05D 1/00 180/169
8,903,588 B2 * 12/2014 Schmudderich .. B60W 30/0956 701/23
2010/0010733 A1 * 1/2010 Krumm ............. G01C 21/3484 701/533
2010/0304640 A1 * 12/2010 Sofman .................. A63H 17/40 446/456
2012/0016581 A1 * 1/2012 Mochizuki ............ G08G 1/161 701/301
2013/0253815 A1 * 9/2013 Orfila ..................... G08G 1/166 701/301
2014/0278052 A1 * 9/2014 Slavin ................ G01C 21/3492 701/400

(Continued)

FOREIGN PATENT DOCUMENTS

WO 2014206655 12/2014

*Primary Examiner* — Ian Jen
(74) *Attorney, Agent, or Firm* — Rankin, Hill & Clark LLP

(57) ABSTRACT

One or more embodiments of techniques or systems for generating turn predictions or predictions are provided herein. Environment layout information of an operating environment through which a first vehicle is travelling may be received. A current location of the first vehicle may be received. One or more other vehicles may be detected. Additional environment layout information from other vehicles may be received. A model including the operating environment, the first vehicle, and one or more of the other vehicles may be built. The model may be based on the environment layout information and the additional environment layout information and indicative of an intent of a driver of one of the other vehicles. Further, predictions may be generated based on the model, which may be based on a Hidden Markov Model (HMM), a Support Vector Machine (SVM), a Dynamic Bayesian Network (DBN), or a combination thereof.

20 Claims, 8 Drawing Sheets

100
110 SENSOR COMPONENT
120 NAVIGATION COMPONENT
130 MODELING COMPONENT
140 PREDICTION COMPONENT
150 NOTIFICATION COMPONENT
160 ASSIST COMPONENT
170 COMMUNICATION COMPONENT

(56) References Cited

U.S. PATENT DOCUMENTS

2014/0358841 A1* 12/2014 Ono .................... G08G 1/0112
706/52
2015/0016678 A1* 1/2015 Imaeda .............. B60W 30/095
382/103

* cited by examiner

TURN PREDICTIONS

BACKGROUND

Navigation at intersections may be a challenging part of driving because intersections may be different. Frequently, accidents may result in injuries or fatalities and may occur at intersections or are intersection related. One cause of accidents may be operator error in failing to observe a traffic signal, a stop sign, etc. As an example, when a driver of a first vehicle turns left, a collision may occur if the driver does not yield properly to a second vehicle.

BRIEF DESCRIPTION

According to one or more aspects, a system for turn predictions may include a navigation component, a communication component, a modeling component, and a prediction component. The navigation component may receive environment layout information of an operating environment through which a first vehicle is travelling and receive a current location of the first vehicle. The communication component may receive additional environment layout information from one or more of the other vehicles. The modeling component may build a model including the operating environment, the first vehicle, and one or more of the other vehicles based on the environment layout information and the additional environment layout information. The model may be indicative of an intent of a driver of one of the one or more other vehicles. The prediction component may generate one or more predictions based on the model.

In one or more embodiments, the environment layout information or the additional environment layout information may include lane level information associated with the operating environment. The modeling component may build the model based on a Hidden Markov Model (HMM), a Support Vector Machine (SVM), a Dynamic Bayesian Network (DBN), or a combination thereof. The communication component may receive vehicle information from one or more of the other vehicles and the modeling component may build the model based on the vehicle information of one or more of the other vehicles. The sensor component may receive environmental layout information and the modeling component may build the model based on the environment layout information.

The prediction component may generate a time-to-collision (TTC) prediction, a collision prediction, or a turn prediction. The system may include a mapping component providing information related to a number of lanes of a roadway, geometry of lanes at an intersection, or legal directions of motion from a lane based on one or more of the predictions and one or more traffic rules. The system may include a notification component rendering a notification of one or more of the predictions. The system may include an assist component determining one or more assist actions based on one or more of the predictions. The environment layout information or additional environment layout information may include a shape of a lane or a number of lanes. The navigation component may determine an intended travel path for the first vehicle based on a destination location and one or more of the predictions for one or more of the other vehicles indicative of motion of respective other vehicles.

According to one or more aspects, a method for turn predictions may include receiving environment layout information of an operating environment through which a first vehicle is travelling and a current location of the first vehicle, detecting one or more other vehicles, receiving additional environment layout information from one or more of the other vehicles, building a model including the operating environment, the first vehicle, and one or more of the other vehicles based on the environment layout information and the additional environment layout information, the model indicative of an intent of a driver of one of the one or more other vehicles, generating one or more predictions based on the model, and rendering one or more of the predictions.

The environment layout information or the additional environment layout information may include lane level information associated with the operating environment. The modeling component may build the model based on a Hidden Markov Model (HMM), a Support Vector Machine (SVM), a Dynamic Bayesian Network (DBN), or a combination thereof. The method may include receiving vehicle information from one or more of the other vehicles and building the model based on the vehicle information of one or more of the other vehicles. The method may include receiving environmental layout information (or additional environment layout information) from a sensor and building the model based on the environment layout information. The method may include generating a time-to-collision (TTC) prediction, a collision prediction, or a turn prediction.

According to one or more aspects, a system for turn predictions may include a navigation component, a sensor component, a communication component, a modeling component, and a prediction component. The navigation component may receive environment layout information of an operating environment through which a first vehicle is travelling and a current location of the first vehicle. The environment layout information may include lane level information associated with the operating environment, a shape of a lane of a roadway within the operating environment, or a number of lanes of a roadway within the operating environment. The sensor component may detect one or more other vehicles. The communication component may receive additional environment layout information from one or more of the other vehicles. The modeling component may build a model including the operating environment, the first vehicle, and one or more of the other vehicles based on the environment layout information and the additional environment layout information. The model may be indicative of an intent of a driver of one of the one or more other vehicles. The prediction component may generate one or more predictions based on the model.

The modeling component may build the model based on a Hidden Markov Model (HMM), a Support Vector Machine (SVM), a Dynamic Bayesian Network (DBN), or a combination thereof. The prediction component may generate a time-to-collision (TTC) prediction, a collision prediction, or a turn prediction. The navigation component may determine an intended travel path for the first vehicle based on a destination location and one or more of the predictions for one or more of the other vehicles indicative of motion of respective other vehicles.

One or more components or one or more portions of a system or method for turn predictions or predictions may be implemented via a processor, processing unit, a memory, etc.

DETAILED DESCRIPTION

Figure 1:
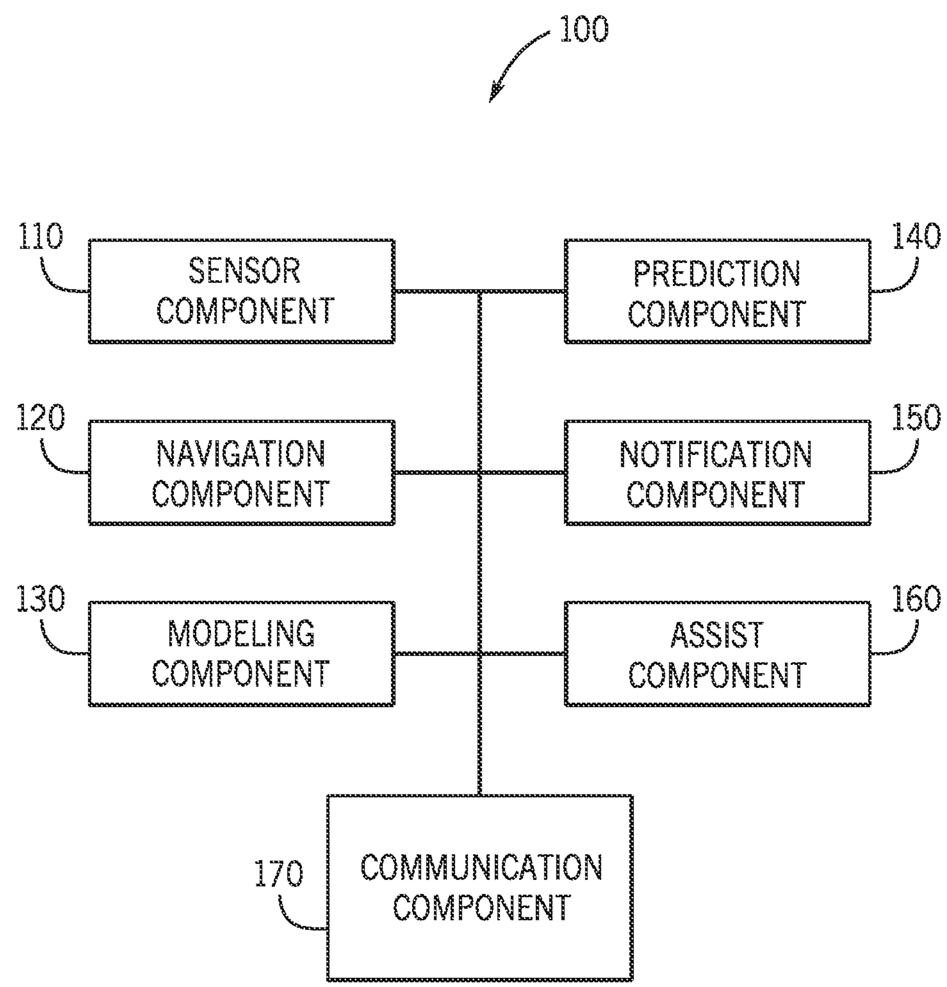
FIG. 1 is an illustration of an example component diagram of a system for turn predictions, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure.

A first vehicle or a current vehicle described herein may be a vehicle equipped with a system for turn predictions, while a second vehicle, another vehicle, or other vehicles may be vehicles which represent obstacles, obstructions, or traffic as to the first vehicle or current vehicle. However, in one or more scenarios, a second vehicle, another vehicle, or other vehicles may be equipped with other or similar systems for turn predictions or be equipped with vehicle to vehicle communication modules to facilitate vehicle to vehicle communication between the first vehicle and the second vehicle.

As used herein, environment layout information may include features or characteristics of an operating environment or a navigation environment, such as intersections, roadways (e.g., which include lanes), road segments, obstructions, lane geometries, lane boundaries, number of lanes, obstacles, etc. Additionally, the environment layout information may include coordinates, shapes, contours, features, topology, elevation change, or layouts of respective intersections, roadways, road segments, etc.

As used herein, vehicle information, such as vehicle information associated with environment layout information (e.g., associated vehicle information), may include movement information, acceleration, velocity, angle of motion, steering angle, bearing, heading, orientation, position, location, pitch, roll, yaw, angle of incline, etc. of an associated vehicle or a log or history thereof. The current position, current location, past positions, or past locations associated with another vehicle may include a lane position or a lane location for the corresponding vehicle. Thus, location history (e.g., past positions) and associated velocities or other vehicle information may be stored or collected by a second vehicle and provided to a first vehicle. Other examples of associated vehicle information may include a log or history of whether features of the vehicle were engaged, such as anti-lock brakes, etc.

As used herein, the terms “infer” or “inference” generally refer to the process of reasoning about or inferring states of a system, a component, an environment, a user from one or more observations captured via events, information, or data, etc. Inference may be employed to identify a context or an action or may be employed to generate a probability distribution over states. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

Highway autonomous driving systems may be implemented in production vehicles. Autonomous driving systems may navigate around or compensate for pedestrians or other vehicles moving in a less structured environment. At intersections, vehicles often follow traffic rules, stop signs, and pass through the intersection based on an order precedence. Thus, to facilitate the passing through of an intersection, a system for turn predictions may provide predictions for a direction of motion of other vehicles. This may be achieved by generating a driver intention prediction model for general intersections. In other words, providing a system or method which may build the driver intention prediction model regardless of the characteristics of the intersection, thereby customizing predictions for most any intersection.

In one or more embodiments, lane-level maps (e.g., which may be high resolution lane level maps) may be used to build one or more statistical models. Examples of statistical models used for the driver intention prediction model may include a Hidden Markov Model, a Support Vector Machine, and/or a Dynamic Bayesian Network for driver intention prediction of other vehicles.

A system for turn predictions may gather real-time vehicle information from other vehicles, such as a second vehicle, which have travelled or passed through a target area, such as an intersection, shortly before (e.g., during a five second window) a first vehicle arriving at the intersection or target area. Thus, past positions, movements, velocities, etc. of other vehicles may be recorded or stored and transmitted to a communication component of a system for turn predictions equipped on a first vehicle. In this way, vehicles may communicate features or characteristics of the operating environment as environment layout information as well as information pertaining to how that other vehicle travelled at different locations within the environment, thereby enabling a first vehicle to model a target area and generate predictions accordingly for one or more other vehicles in the target area.

Thus, detailed environment layout information or other associated vehicle information relating to a target area may be received, such that respective information is accurate and up to date in real-time, without requiring the first vehicle to have a line of sight to the target area. In this way, a second vehicle may communicate to a first vehicle, features about an intersection which a first vehicle is approaching (e.g., using the fact that the second vehicle had access to the intersection prior to the first vehicle). Because no pre-existing knowledge of an operating environment or navigation environment is required, non-traditional intersections may be mapped or modeled accordingly, in a generalized fashion. This information (including environment layout information and/or associated information from the other vehicle) may be utilized to model or otherwise 'map' a roadway, road segments, or other features of an operating environment by a modeling component of the system for turn predictions of the first vehicle.

FIG. 1 is an illustration of an example component diagram of a system 100 for turn predictions, according to one or more embodiments. The system 100 may include a sensor component 110, a navigation component 120, a modeling component 130, a prediction component 140, a notification component 150, an assist component 160, and a communication component 170. Respective components may provide a variety of functionality for the system 100 for turn predictions.

For example, the sensor component 110 may detect one or more other vehicles, such as a second vehicle, third vehicle, etc. The sensor component 110 may include different types of sensors to facilitate such detection, including a radar unit, a laser unit, etc. Additionally, the sensor component may detect vehicle information associated with another vehicle, such as second vehicle information associated with the second vehicle. Thus, the sensor component may detect different aspects associated with different vehicles, such as a velocity of another vehicle via a radar sensor component or radar unit of the sensor component 110, a current lane location or a current lane position of another vehicle via an image capture sensor component or image capture unit of the sensor component 110, etc.

The sensor component 110 may receive vehicle information related to or associated with environment layout information, such as a speed or velocity (via a radar unit) of the other vehicle at different points in the operating environment or navigation environment. In other words, the sensor component 110 may collect or gather, in real-time, vehicle information from other vehicles which have gone, travelled, passed through, passed by, etc. an upcoming intersection shortly before (e.g., within a five second window) the first vehicle or current vehicle arriving at the same intersection.

In one or more embodiments, the sensor component 110 may detect presence or absence of one or more driving cues or one or more driving actions, such as a turn indicator or turn signal of another vehicle. This information may be provided to the modeling component 130 for generation of a corresponding model associated with the other vehicle. In other words, the modeling component 130 may connect an observation of a turn signal with one or more available or potential travel paths or an intended route for a driver. For example, if the sensor component 110 detects that a driver of another vehicle has his or her left turn signal on, the modeling component 130 may build a model which is indicative of an inference that the other vehicle has a high likelihood of turning left.

Similarly, the sensor component 110 may detect environment layout information (e.g., via image capture or an image capture unit of the sensor component 110). For example, the sensor component 110 may detect a layout of an intersection, a number of lanes in an intersection, etc., such as by observing lane markings. In other words, the sensor component 110 may identify one or more features of an operating environment or navigation environment using different types of sensors, such as an image capture unit, a vision unit, a laser unit, a radar unit, etc. of the sensor component 110. The sensor component 110 may identify an intersection, a layout of an intersection, features of an intersection, etc. using an image capture unit. Here, the sensor component 110 may receive vision data or image data which is used to map a layout of an intersection or otherwise extract environment layout information associated with an operating environment through which a vehicle is driving or travelling. In one or more embodiments, the environment layout information detected or received by the sensor component 110 may be used to supplement other environment layout information received from other sources, such as the communication component 170, for example.

Further, the sensor component 110 may detect a current position for a current vehicle or a first vehicle (e.g., via image capture). For example, an image capture sensor component 110 may determine that a current position for a first vehicle is a "right turn only lane" based on lane markings, etc. Similarly, the sensor component 110 may use image capture capabilities to determine a shape of a roadway, obstructions, a portion of an intersection, etc. For example, the sensor component 110 may determine that a roadway or road segment leading up to an intersection has a curved shape. Additionally, the sensor component 110 may be used to estimate a distance to a target area, such as a distance to an intersection, distance to a center-line of a lane, etc.

In one or more embodiments, the communication component 170 may aid or be used for detecting one or more other vehicles, such as a second vehicle, third vehicle, etc. For example, the communication component 170 may detect other vehicles via vehicle to vehicle communications between a first vehicle and a second vehicle.

The communication component 170 may enable a vehicle (e.g., first vehicle or current vehicle) equipped with a system 100 for turn predictions to communicate with one or more other vehicles (e.g., second vehicle, other vehicle, another vehicle, etc.). For example, the communication component 170 may include one or more transmitters and one or more receivers which may be configured to transmit or receive signals or information, respectively, thereby enabling a first vehicle to communicate with a second vehicle. The communication component 170 may be implemented across one or more wireless channels, telematics channels, short-range communications channels, etc.

The communication component 170 may receive (or transmit) environment layout information (e.g., via vehicle to vehicle or v2v communications). As discussed, examples of environment layout information may include features or characteristics of an operating environment or navigation environment, such as intersections, roadways (e.g., which include lanes), road segments, obstructions, lane geometries, lane boundaries, number of lanes, obstacles, etc.

In one or more embodiments, a communication from a second vehicle may be indicative of environment layout information associated with a current position of the second vehicle. Further, information received during vehicle to vehicle communications, such as the environment layout information or vehicle information associated with the environment layout information, may be utilized to supplement environment layout information received from other components, such as the navigation component 120, for example.

In other words, the navigation component 120 may download a GPS map of an operating environment or navigation environment through which a first vehicle is currently travelling. The navigation component 120 may include environment layout information, such as contour of the roadway, number of lanes. As a driver approaches an upcoming intersection, the modeling component 130 may determine that the intersection is a target area. In one or more embodiments, the first vehicle may open lines of communication with one or more other vehicles at the intersection to determine or receive information about the target area. For example, the communication component 170 may receive information or vehicle information relating to where other vehicles are positioned in the roadway or intersection or how other vehicles make their turns, etc. Although the environment layout information (e.g., GPS map) received from the navigation component 120 may indicate a road segment is shaped in a particular manner, vehicle information or other environment layout information received (e.g., via the communication component 170) from one or more of the other vehicles may indicate that turns along the road segment follow a different shape (e.g., due to obstructions, errors in the GPS map, or other unknown reasons), for example. Thus, environment layout information from one component may be supplemented by environment layout information from another component. In this way, the communication component 170 may utilize vehicle to vehicle communications to supplement or verify at least some of the environment layout information.

In one or more embodiments, the system 100 may include a mapping component (not shown). In other embodiments, the navigation component 120 or other components of the system 100 may include a mapping component or subcomponent which provides environment layout information, such as a number of lane, geometry of lanes at an intersection, legal directions of motion from a lane (e.g., according to traffic rules or traffic laws), associated with a time to collision prediction, collision prediction, turn prediction, etc.

The communication component 170 may also receive (or transmit) vehicle information associated with other vehicles, such as second vehicle information associated with a second vehicle (e.g., via v2v communications). As discussed, vehicle information may include vehicle movement information, acceleration, velocity, angle of motion, steering angle, bearing, heading, orientation, position, location, pitch, roll, yaw, angle of incline, one or more driving actions or one or more navigation actions, such as use of vehicle controls, braking, accelerating, steering, turn signals, etc. for an associated vehicle.

In one or more embodiments, a communication from a second vehicle may be indicative of second vehicle information associated with environment layout information for a current position of the second vehicle. The current position of the second vehicle may be provided with lane level granularity, thus enabling the system 100 for turn predictions to determine a current lane for the second vehicle. For example, the second vehicle may communicate to the communication component 170 of the first vehicle that the second vehicle is currently in a 'left turn only lane'. Due to this, the modeling component 130 may account for one or more corresponding traffic rules associated with 'left turn only lanes' and generate a corresponding model which reflects or represents the second vehicle's turning options (e.g., most likely a left turn) based on the current lane location of the second vehicle.

In this way, lane geometry or road geometry included in the environment layout information received by the communication component 170 may be indicative of realistic potential trajectories for one or more other vehicles and facilitate more accurate inferences or estimates to be made by the prediction component 140 or models generated by the modeling component 130.

In one or more scenarios, the second vehicle may be equipped with one or more sensors or components, such as an image capture component or GPS component which enables the second vehicle to accurately provide a lane level location or position. Thus, the communication component 170 may facilitate vehicle to vehicle communications which enable a first vehicle to receive lane level location or position information associated with a second vehicle. In other embodiments, the sensor component 110 of the first vehicle or current vehicle may be utilized to detect such information.

In this way, the communication component 170 may enable vehicle to vehicle (v2v) communications to occur between vehicles. In one or more embodiments, vehicle to vehicle communications may be achieved in real-time, such that a second vehicle may communicate or transmit environment layout information or vehicle information associated with environment layout information to a first vehicle as (or momentarily after) the respective information is being gathered or detected by the second vehicle.

In one or more embodiments, the communication component 170 may receive information or communications from a second vehicle indicative of historical environment layout information (e.g., relative to a current position or current location of the second vehicle) or historical vehicle information associated therewith. In other words, this environment layout information may be indicative of features or characteristics of the operating environment or navigation environment where a second vehicle has travelled, such as a location or position where the second vehicle was five seconds ago.

A communication from a second vehicle may be indicative of environment layout information associated with one or more past positions of the second vehicle. Thus, the communication component 170 may receive environment layout information which may account for or compensate for construction, obstructions, curved road segments, different lane shapes or directions, etc. of an operating environment or navigation environment in real-time, without requiring the vehicle to have been present or within a line of sight range of a location within the operating environment in order to have such real-time environment layout information.

Similarly, a communication from a second vehicle may be indicative of second vehicle information associated with environment layout information for one or more past positions of the second vehicle. In this way, the communication component 170 may receive environment layout information and/or associated vehicle information from a second vehicle indicative of one or more operating environment features or operating environment characteristics of the operating environment through which the second vehicle previously travelled, such as operating environment features associated with a location at which the second vehicle was located five seconds prior to a current time (e.g., t−5) and how fast or the velocity of the associated vehicle five seconds ago, at a previous, corresponding location. Here, the communication component 170 may receive environment layout information indicative of features of previously travelled territory or terrain for other vehicles. This information may be used to generate a model of upcoming roadways, intersections, or road segments for a vehicle. Further, the modeling component 130 may use this information to generate a model for other vehicles.

Explained yet another way, the communication component 170 may enable vehicles (e.g., vehicles passing one another, heading towards one another, travelling towards a same intersection, on the same roadway, etc.) to feed, transmit, exchange, or pass each other information, which may be used to 'map' a shape or a contour of the operating environment (e.g., intersection, roadway, etc.) prior to one of the vehicles arriving at the intersection or roadway. Accordingly, the communication component 170 may enable a system 100 for turn predictions to receive environment layout information which is accurate in real-time without any pre-existing knowledge of the operating environment, intersection roadway, etc., such as whether an intersection has a non-traditional shape or contour, is non-perpendicular, etc.

Further, the communication component 170 may enable components, units, or sub-systems within a system 100 for turn predictions to communicate with one or more other components, units, or sub-systems of the system 100 for turn predictions. For example, the communication component 170 may pass information from the modeling component 130 to the prediction component 140 or from the prediction component 140 to the notification component 150 or assist component 160 via a controller area network.

The modeling component 130 may build a model or predictive model of an intersection, roadway, road segment, etc. of an operating environment or navigation environment and one or more vehicles within the environment. The model may include generalized intersection information (e.g., from the navigation component 120), real-time environment layout information (e.g., from the communication component 170 or the sensor component 110), etc. In other words, the model may be based on environment layout information received from the sensor component 110 (e.g., via image capture or other sensors), environment layout information received from the navigation component 120 (e.g., pre-mapped environment layout information), environment layout information received from the communication component 170 (e.g., real-time environment layout information), and/or vehicle information received from other vehicles.

Unlike models built using Constant Yaw Rate and Acceleration (CYRA), the model built by the modeling component 130 may account for one or more roadways of an intersection, a number of lanes, lane geometries, topology of the environment, contour of the environment, lane level details or lane level mapping information, etc. Because lane level models are built by the modeling component 130, complexities associated with the structure of intersections may be reduced. Further, the modeling component 130 may model behavior, intended travel paths, routes, inferences, etc. for one or more vehicles based on one or more traffic rules based on lane level details (e.g., number of lanes, current lane position of vehicle, etc.). The modeling component 130 may calculate one or more features associated with the operating environment or navigation environment based on environment layout information. For example, the modeling component 130 may calculate lane curvature, inside/outside lanes, distance of vehicle to center-lines, distance to an intersection, difference between vehicle driving direction angle and lane direction, etc.

In one or more embodiments, the model may include one or more vehicles, such as a first vehicle or current vehicle and a second vehicle or other vehicle in the surrounding operating environment. Here, the modeling component 130 may identify one or more potential travel paths or intended travel paths for one or more of the vehicles which are specific to a modeled intersection. In other words, the modeling component 130 may build a model for another vehicle which indicates an intended travel path for the other vehicle or driver intentions for the driver of the other vehicle. Explained yet another way, the potential travel paths of a model may be based on the shape or lanes of the intersection, thereby enabling predictions to be made with regard to an inferred turning radius, turning speed, lane location, etc. Accordingly, driver intention (e.g., left turn, right turn, straight, U-turn, etc.) may be predicted for other vehicles or other traffic participants of an intersection.

Because the model built by the modeling component 130 may be specific to an intersection or operating environment and account for one or more vehicles in the operating environment, the model may represent an assessment of a current situation or scenario (e.g., as to other vehicles present) for a driver of a first vehicle or current vehicle and may be more accurate than other models because this model may account for real-time changes in the operating environment as well as real-time changes associated with other vehicles, thus enabling a system 100 for turn predictions to build models or generate predictions in a customizable fashion.

In one or more embodiments, the modeling component 130 may build one or more of the models based on a Hidden Markov Model (HMM), a Support Vector Machine (SVM), or a Dynamic Bayesian Network (DBN). One or more embodiments may employ various artificial intelligence (Al) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x) =confidence (class). Such classification may employ a probabilistic or statistical-based analysis (e.g., factoring into the analysis utilities and costs) to prognose or infer an action that a user desires to be automatically performed.

The modeling component 130 may extract one or more features from environment layout information or associated vehicle information with a number of dimensions from one or more sequential observations for a classifier, such as the Support Vector Machine (SVM). Observations (of the sequential observations) may include environment layout information or associated vehicle information. These sequential observations may be modeled and interpreted by the modeling component 130 with one or more unobserved or hidden states using time-series analysis, such as the Hidden Markov Model (HMM) or the Dynamic Bayesian Network (DBN). The modeling component 130 may build one or more models using a classification based approach or a dynamic inference based approach.

In one or more embodiments, the modeling component 130 may build one or more models based on the Hidden Markov Model (HMM). For example, a HMM may be used to represent a dynamic process observed through Markov Chains.

In one or more embodiments:

$Y=[y_1, y_2, y_3 \ldots y_t]$ representing an observation sequence may be determined by $Q=[q_1, q_2, q_3 \ldots q_t]$ representing a discrete hidden state sequence Thus, a travel path of a vehicle may be divided in to one or more discrete hidden states. For example, a right turn of a second vehicle may be described by a HMM with 5 hidden discrete states: approaching the intersection, start turning right, the right turning, finish turning right, and driving away from the intersection. Similar HMM may be implemented for other driving actions, such as left turns, travelling straight, etc.

In one or more embodiments, the modeling component 130 may be trained to generate a model based on HMM during a learning stage. In the learning stage, the modeling component 130 may be provided with a set of observation sequences or one or more sequential observations, one or more parameters associated with state transition, and a distribution of observations to be learned. Here, for each HMM, a Gaussian Mixture Model (GMM) may be assumed. In one or more embodiments:

$\pi=\{\pi_{ij}\}_{M\times M}$ representing parameters of state transition probability matrix $p(y_t|q_t)$ representing distributions of observations to be learned for M hidden states For each HMM, assume $p(y_t|q_t)$ has a Gaussian Mixture Model (GMM) distribution with parameter set $\theta$ Further, the modeling component 130 may use an Expectation-Maximization (EM) algorithm, such as the Baum Welch algorithm to generate an approximation or a model. The expectation calculation may provide the expectation of the log-likelihood given the current system states and transition probabilities, and the maximization calculation may adapt the model parameters to maximize the expectation of log-likelihood. By iteratively applying the expectation and maximization steps, the maximum likelihood estimations $\pi$ and $\theta$ may be approximated by the modeling component 130.

After the modeling component 130 is trained, the probability of an observation sequence $y_{1:t}$ may be calculated that is created by a HMM hmm($\pi$, $\theta$) or $p(y_{1:t}|hmm(\pi, \theta))$. Further, different HMMs may be built for right turns $hmm_1(\pi_1, \theta_1)$, left turns $hmm_2(\pi_2, \theta_2)$, straight driving $hmm_3(\pi_3, \theta_3)$, etc., thereby enabling the modeling component 130 to classify one or more driving actions of a driver of another vehicle. The Baum Welch algorithm may be applied to learn parameters $\pi_i$ and $\theta_i$, where (i=1, 2, 3 . . . ) for each HMM.

Thus, when a new sequence of observations $y_{tt}$ are provided, the sequence may be classified into one or more potential driving behaviors using the Maximum a Posterior (MAP) rule.

In one or more embodiments:

$$i=\underset{i=\{1,2,3\}}{\operatorname{argmax}}\ p(hmm_i(\pi_i,\theta_i)|y_{1:t})$$

$$\propto \underset{i=\{1,2,3\}}{\operatorname{argmax}}\ p(y_{1:t}|hmm_i(\pi_i,\theta_i))p(hmm_i(\pi_i,\theta_i)|y_{1:t})$$

where $p(hmm_i(\pi_i,\theta_i)$ is prior probability of each class of turning on the roadway If $p(hmm_i(\pi_i,\theta_i)$ has uniform distribution $$i=\underset{i=\{1,2,3\}}{\operatorname{argmax}}\ p(y_{1:t}|hmm_i(\pi_i,\theta_i))$$

In one or more embodiments, the modeling component 130 may build one or more models based on the Support Vector Machine (SVM). SVM offers a robust and efficient classification approach for driver intention prediction by constructing a hyperplane in a higher dimensional space. The hyperplane may provide a separation rule with a largest distance to the "support" training data of any class.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification, as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

In one or more embodiments, the modeling component 130 may build one or more models based on the Dynamic Bayesian Network (DBN). A DBN model may be based on one or more traffic rules (e.g., turn options based on lane location or position) and lane level locations of one or more vehicles. Further, vehicle information (e.g., such as a turn indicator light of another vehicle being activated, as detected by the sensor component 110) may be used to connect an observation of the turn signal to a hidden state of a driver's intention directly, which would facilitate modeling of the inference of a driver's intention or generating a corresponding prediction. In other words, the DBN model may maintain probability distributions over one or more (or all) hidden states, including driver's intention, lane index, and vehicle controls (e.g., "braking", "accelerating" and "steering").

For example, the modeling component 130 may generate a model based on one or more observations (e.g., extracted from the environment layout information or associated vehicle information) of vehicle position or vehicle velocity of other vehicles. In one or more embodiments, the modeling component 130 may infer driver intention as a latent state/from one or more of the observations. In this way, the modeling component 130 may generate one or more predictive models for one or more other vehicles. Additionally, other hidden states may include the true position and velocity of a vehicle (s and v), control variables of a vehicle (a and $\Delta\alpha$), and the driving lane index L.

In one or more embodiments:

$s=[s_x,s_y]$ representing true position $v=[v_x,v_y]$ representing true velocity a representing acceleration value $\Delta a$ representing driving direction change $\hat{s}$ representing state of true position s $\hat{v}$ representing state of true velocity v $y=[s_x,s_y,v_x,v_y]$ representing variable vector for observation state of Y $o=[\hat{s}_x,\hat{s}_y,\hat{v}_x,\hat{v}_y]$ representing variable vector for hidden state of O $c=[a,\Delta\alpha]$ representing variable vector for hidden state of C During experiments, a real-world dataset of 375 turning tracks was created using a variety of 3 way and 4 way intersections. Turn predictions or predictions included a left, a right, or a straight direction of travel for vehicles at the intersection. A 90% turn prediction accuracy at 1.6 meters before the intersection and an accuracy of 93.8% at the intersection were achieved using a SVM. Thus, the subject application advances the technological field of Advanced Driver Assistance Systems and Autonomous Driving Systems with a powerful turn prediction model for general or most any intersection.

Figure 5:
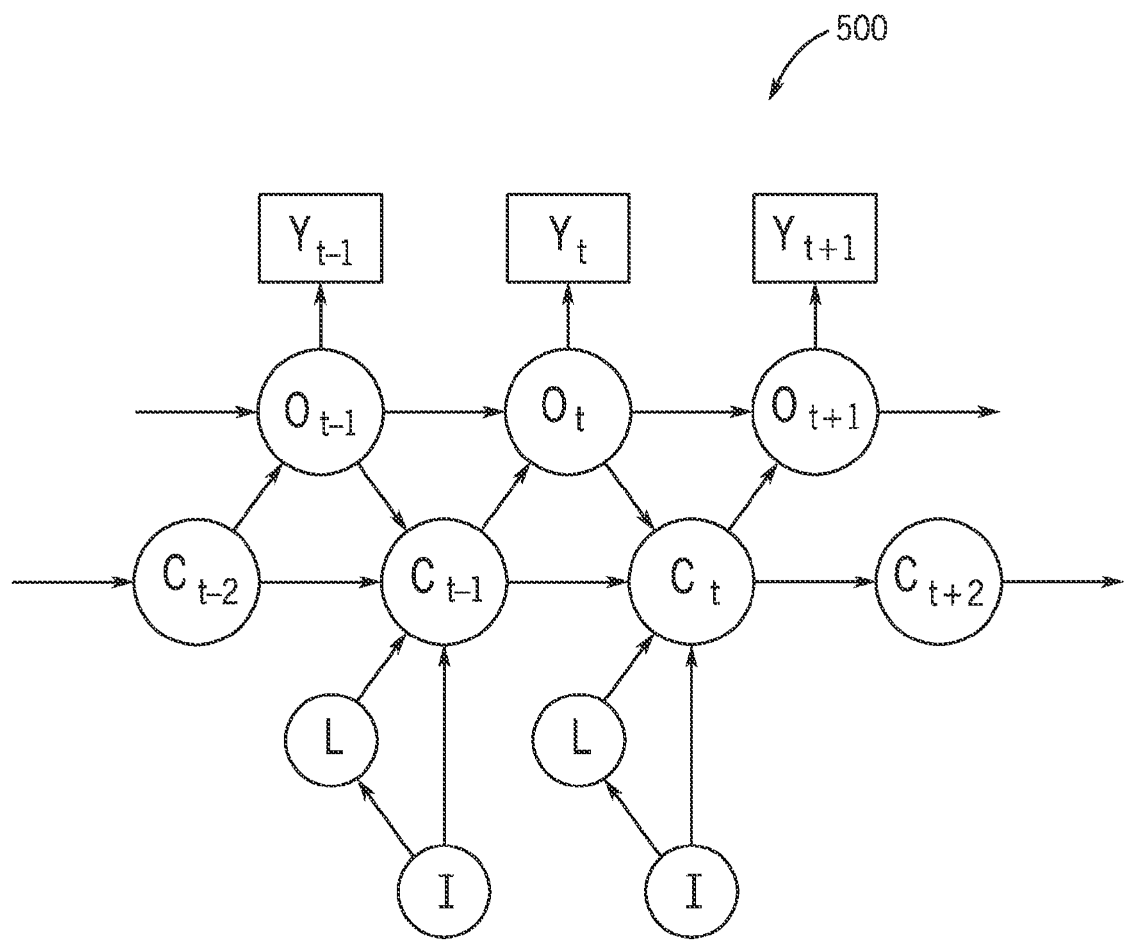
FIG. 5 is an illustration of an example graphical representation of a Dynamic Bayesian Network (DBN) for use with turn predictions, according to one or more embodiments.

FIG. 5 is an illustration of an example graphical representation 500 of a Dynamic Bayesian Network (DBN) for use with turn predictions, according to one or more embodiments. Here, t may represent time, Y may represent observed position and velocity, O may represent true position and velocity, C may represent a vehicle control variable, L may represent lane index, and I may represent driver intention. Here, the nodes may represent random variables, while the arcs may represent conditional independence. In one or more embodiments, Y, O, and C may be time-dependent continuous variables, while driver intention I and driving lane index L may be discrete variables which may be assumed to be constant when a corresponding vehicle drives or travels through an intersection or target area. The lane index L may indicate a lane from which a vehicle initiates a turn or a lane from which the vehicle drives into a turning lane at an intersection.

In one or more embodiments, the DBN may represent a distribution:

$$p(y(t),o(t),c(t)|y(t-1),o(t-1),c(t-1),L,I)$$

Given hidden states, a likelihood of observation may have a Gaussian distribution:

$$P(y(t)\mid o(1:t),\,c(1:t),\,L,\,I) = P(y(t)\mid o(t)) = \frac{1}{2\pi\sigma_s\sigma_v}\exp\left\{-\frac{\|s-\hat{s}\|^2}{2\sigma_s^2}-\frac{\|v-\hat{v}\|^2}{2\sigma_v^2}\right\}$$

where the operator $\|x\|$ denotes a Euclidean norm of a vector x

Thus, the true position and true velocity of a vehicle may be represented:

$$s_x(t)=s_x(t-1)+v_x(t-1)\Delta T+w_x$$

$$s_y(t)=s_y(t-1)+v_y(t-1)\Delta T+w_y$$

$$\|v(t)\|=\|v(t-1)\|+a(t-1)\Delta T+w_a$$

$$\angle v(t)=\angle v(t-1)+\Delta\alpha(t-1)+w_\alpha$$

$$v_x(t)=\|v(t)\|\cos(\angle v(t))$$

$$v_y(t)=\|v(t)\|\sin(\angle v(t))$$

$$w_x\sim\mathcal{N}(0,\sigma_x^2)$$

$$w_y\sim\mathcal{N}(0,\sigma_y^2)$$

$$w_a\sim\mathcal{N}(0,\sigma_a^2)$$

$$w_\alpha\sim\mathcal{N}(0,\sigma_\alpha^2)$$

$$c(t)=[a(t),\Delta\alpha(t)]\text{ control variables}$$

where hidden states may reflect driver intention I based on turning restrictions (e.g., traffic rules, etc.) from a lane L Given true states of the vehicle o(t−1) and c(t−1) at time(t−1), a lane number L, an underlying driver intention I, control variables at time t may be sampled from a conditional distribution of p(c(t)|c(t−1),o(t−1),I,L)=p(c(t)|c(t−1), x(t−1),I). Because the control of a vehicle is generally determined by the position or location of a vehicle within a lane through which the vehicle travels into an intersection from the following may be determined:

$$p(c(t)|c(t-1),o(t-1),I,L)=p(c(t)|c(t-1),x(t-1),I)$$

$$x(t-1)=[d_{intersection}d_{center}\alpha]$$

$d_{intersection}$ representing a distance from a vehicle to an intersection $d_{center}$ representing a distance to a lane center $\alpha$ representing an angle of a driving direction of a vehicle relative to the lane direction $d_{intersection}$, $d_{center}$, and $\alpha$ may, for example, be measured or determined by a sensor component 110, navigation component 120, etc. of a system 100 for turn predictions.

Given o(t−1) and L at time (t−1), features x(t−1) may be calculated by the modeling component 130. For each class of turning (e.g., I given), the distribution p(c(t)|c(t−1),x(t−1)) may satisfy a Gaussian mixture model (GMM).

Further, the modeling component 130 may use an Expectation-Maximization (EM) algorithm or method to estimate, calculate, or determine parameters of GMMs or variances $\sigma_x^2$, $\sigma_y^2$, $\sigma_a^2$, and $\sigma_\alpha^2$. The modeling component 130 may infer hidden states by employing particle filtering to approximate posterior distribution of hidden states. Because the driving lane L may be conditionally dependent on the intention I, knowledge of available turning options may be incorporated into models generated by the modeling component 130.

Regardless, the modeling component 130 may generate one or more models of the operating environment or other vehicles based on lane position of the other vehicles, traffic rules, turning options from different lane positions, etc. to infer driver intention of one or more of the other vehicles. Further, vehicle information or other observations, such as activation of turn signals, drift, etc. may be used to connect a model, such as a DBN model to a hidden state of a driver's intention directly, thus facilitating determination of driver intention by the modeling component 130 or a corresponding prediction by the prediction component 140.

In one or more embodiments, the modeling component may extract one or more features or observations from environment layout information or vehicle information, including distance between a vehicle and a lane center $d_{center}$, distance from a vehicle to an intersection $d_{intersection}$, angle of a vehicle's driving direction relative to a lane direction $\alpha$, velocity of a vehicle v, and acceleration of a vehicle a. Again, different components of the system 100 for turn predictions or predictions may be used to detect, collect, or gather such information, such as the sensor component 110, the navigation component 120, the communication component 170, etc.

A positive value of $d_{center}$ may indicate that a vehicle is driving to a right side of lane center, while a negative value of $d_{center}$ may indicate the vehicle is driving to a left side of lane center. A value of $\alpha$ may be positive when a vehicle is driving to a right of a lane, and negative when the vehicle is driving to the left of the lane. When $d_{intersection}=0$, a vehicle is driving into a corresponding intersection. $d_{center}$ and $\alpha$ may be indicative of a turning movement for a vehicle. For example, if turning left, the vehicle is more likely located in or towards to the left side of lane. Thus, $d_{center}$ may be negative or $\alpha$ may be negative. When a vehicle is driving straight, $d_{center}$ and $\alpha$ would be close to or approach zero.

These models may use lane level environment layout information (e.g., lane level maps, lane geometry) or a structure, a shape, a contour, an elevation change, observations thereof, etc. of an intersection to infer an intended travel path for different vehicles. Accordingly, the modeling component 130 may build a lane level model of an operating environment in which two or more vehicles are operating or traveling.

In one or more embodiments, a model or predictive model may be used by the prediction component 140 to generate one or more predictions of driver intentions for drivers of other vehicles within the operating environment, such as at an intersection. Accordingly, these predictions may be used for turn predictions associated with other vehicles in a customizable or generalized fashion. The prediction component 140 may generate one or more predictions for one or more other vehicles in the operating environment based on one or more corresponding models. Thus, the prediction component 140 may generate one or more of the predictions based on a Hidden Markov Model (HMM), a Support Vector Machine (SVM), or a Dynamic Bayesian Network (DBN).

The prediction component 140 may generate one or more turn predictions based on a model for a second vehicle or another vehicle. A turn prediction may be indicative of a likelihood, a probability, an intent, or an inference that a second vehicle or other vehicle is turning a given direction, such as in a direction towards a current vehicle or a first vehicle, for example. In other words, a prediction such as a turn prediction may be indicative of a predicted intention of a driver of another vehicle on the roadway or at an intersection. In one or more embodiments, turn predictions for other vehicles at intersections may be generated based on real-time information from other vehicles which have gone or passed through the intersection shortly before (e.g., within an X second window) a first vehicle or a current vehicle arrives at the same intersection. In this way, movement history or vehicle information history may be used to generate turn predictions.

The prediction component 140 may generate one or more collision predictions based on a model for a second vehicle or another vehicle. The prediction component 140 may generate the collision prediction based on an intended route for a first vehicle or a current vehicle and a turn prediction associated with another vehicle, such as a second vehicle. A collision prediction may be indicative of a potential collision position or location. The prediction component 140 may generate one or more time-to-collision (TTC) estimates for one or more other vehicles based on one or more of the models and/or corresponding vehicle information, such as velocity, acceleration, etc. In this way, the prediction component 140 may generate one or more predictions based on past positioning or past locations of one or more other vehicles.

The navigation component 120 may receive environment layout information (e.g., via GPS). In one or more embodiments, the environment layout information may include lane level layout information, such as a number of lanes associated with a roadway or road segment, lane level maps, lane boundaries or lane dimensions, etc. The navigation component 120 may receive the environment layout information via a telematics channel or via a global positioning system (GPS) link established by the communication component 170. In one or more embodiments, the environment layout information may include GPS data associated with coordinates of one or more roadways, one or more lanes, a shape of a turn, a shape of an intersection, etc. This information or environment layout information may be pre-mapped, when provided by GPS or satellite mapping, for example.

As discussed herein, in other embodiments, the environment layout information may be received on the fly, in real-time or be locally stored on the navigation component 120, etc. Further, real-time environment layout information and pre-mapped environment layout information may be utilized to supplement one another. For example, pre-mapped environment layout information received by the navigation component 120 associated with an intersection may indicate that a left turn lane is available at a roadway of the intersection. However, real-time environment layout information received by the communication component 170 via vehicle to vehicle communications between a first vehicle and a second vehicle may indicate that a traffic barrel is blocking the left turn lane of the roadway at that intersection. Thus, a travelled travel path for the second vehicle may be used to build a model for that intersection which accounts for the traffic barrel (e.g., and a possibility that other vehicles may turn left from other lanes). In this way, environment layout information (e.g., pre-mapped environment layout information) from one component, such as the navigation component 120, may be supplemented with environment layout information (e.g., real-time environment layout information) from another component, such as the communication component 170 or the sensor component 110.

Further, the navigation component 120 may determine a current position and/or an intended travel path or route for a first vehicle or a current vehicle based on a navigation unit, GPS, an entered destination, vehicle information for the first vehicle, such as vehicle heading, bearing, direction, activation of a turn signal, steering angle, etc. The navigation component 120 may determine the current position of the current vehicle at a lane level of granularity or such that a lane level position or location is determined. In one or more embodiments, the communication component 170 may pass first vehicle information from one or more other components to the navigation component 120 to facilitate determination of an intended route for the first vehicle.

The navigation component 120 may further determine a travel path for a vehicle based on one or more of the predictions for one or more of the other vehicles indicative of motion of respective other vehicles. In other words, the navigation component may use one or more of the models or one or more of the predictions to facilitate autonomous driving actions.

Further, the navigation component 120 may store vehicle information history, navigation history, location history, velocity history, etc. Examples of vehicle information may include a log or history of a velocity of a vehicle, acceleration of a vehicle, whether anti-lock brakes were engaged, steering angle, etc. In one or more embodiments, the navigation component 120 may be implemented with or use a storage unit, etc., such as the storage 820 of FIG. 8. In one or more embodiments, the navigation component 120 may calculate velocity or acceleration of a first vehicle or current vehicle, such as based on Savitzky Golay filtering, for example.

The notification component 150 may render or provide one or more notifications based on one or more of the predictions. In one or more embodiments, the notification component 150 may render one or more of the notifications when a collision prediction is indicative of a risk of collision greater than a threshold risk level, for example. Thus, the notification component 150 may render a warning notification which warns a driver or occupants of a current vehicle that it may not be safe to enter an intersection, make a turn, or proceed with a driving action due to a risk of collision.

A notification may include an audio notification, a visual notification, a tactile notification, etc. In one or more embodiments, a notification may be rendered which includes lane level detail of a roadway or intersection as well as one or more vehicles located at corresponding locations.

The assist component 160 may determine one or more assist actions based on one or more of the predictions, such as by providing an assist action in response to a collision prediction. For example, the assist component 160 may facilitate autonomous driving by using turn predictions or collision predictions from a model or predictive model to determine or infer an intent associated with a driver of another vehicle, thus enabling the assist component 160 to determine or 'know' where the other vehicles can go, where the other vehicles are likely to go, etc.

Thus, the assist component 160 may determine assist actions which mitigate or prevent crossing a travel path of a current vehicle or first vehicle with an inferred travel path for another vehicle or second vehicle, thereby enabling autonomous actions to be taken. As an example, the assist component 160 may enable one or more autonomous features, such as an advanced driver assisted system (ADAS), other autonomous driving systems, intersection movement assist (IMA), left turn assist (LTA), etc., to cause a vehicle to make a turn or mitigate a collision at an intersection (e.g., using environment layout information and/or associated vehicle information of one or more other vehicles).

Thus, one or more of the embodiments disclosed herein provides advancements in advanced driver assisted systems (ADAS) or other autonomous driving systems by providing a turn prediction model which is applicable at most any intersection.

Figure 2:
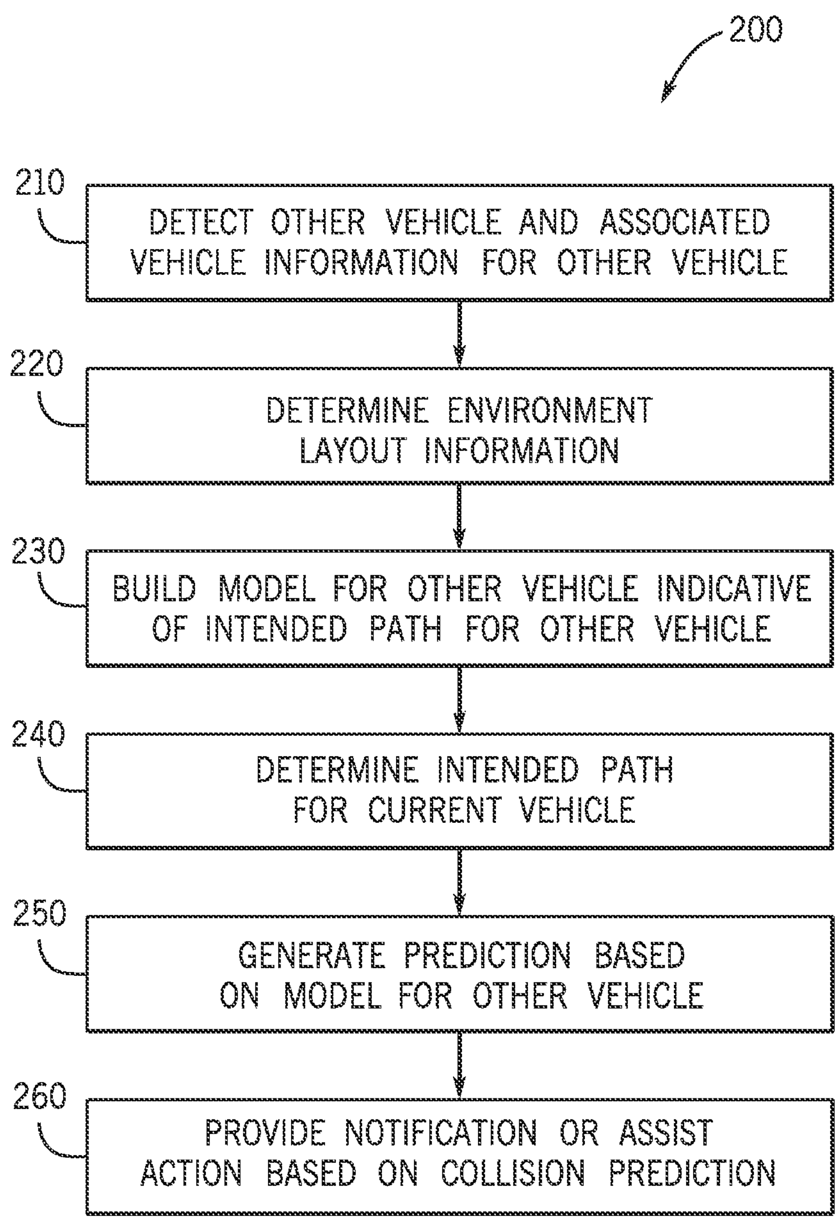
FIG. 2 is an illustration of an example flow diagram of a method for turn predictions, according to one or more embodiments.

One or more of the following figures may be described with reference to components of previously described figures, such as the components of FIG. 1, for example. FIG. 2 is an illustration of an example flow diagram of a method 200 for turn predictions, according to one or more embodiments.

At 210, one or more other vehicles may be detected and associated vehicle information for other vehicles received. For example, a first vehicle may detect another vehicle, such as a second vehicle. At 220, environment layout information may be determined or received. For example, the first vehicle may receive, sense, or detect the environment layout information. Because intersections and roadways of an operating environment or navigation environment may be unique in that different intersections may have different shapes, number of legs or road segments, road turn types, number of lanes, intersection angles, etc., environment layout information may be gathered or collected from a variety of sources or different components, such as using vehicle to vehicle communications with a second vehicle (e.g., via a communication component 170), using pre-mapped data across a telematics channel (e.g., via a navigation component 120 or a global positioning system unit or GPS unit), or using the sensor component 110. Here, the first vehicle may receive vehicle information associated with environment layout information from the second vehicle. At 230, a model for another vehicle indicative of an intended travel path for other vehicle may be built. The model may also represent the operating environment or the navigation environment and other surrounding vehicle within the environment, such as second vehicle or third vehicle, for example. Further, the model may be indicative of an intent of a driver of another vehicle. At 240, an intended travel path for a current vehicle may be determined. At 250, a prediction, such as a collision prediction or turn prediction based on the model for other vehicle may be generated. At 260, a notification or an assist action may be provided based on the prediction.

Figure 3:
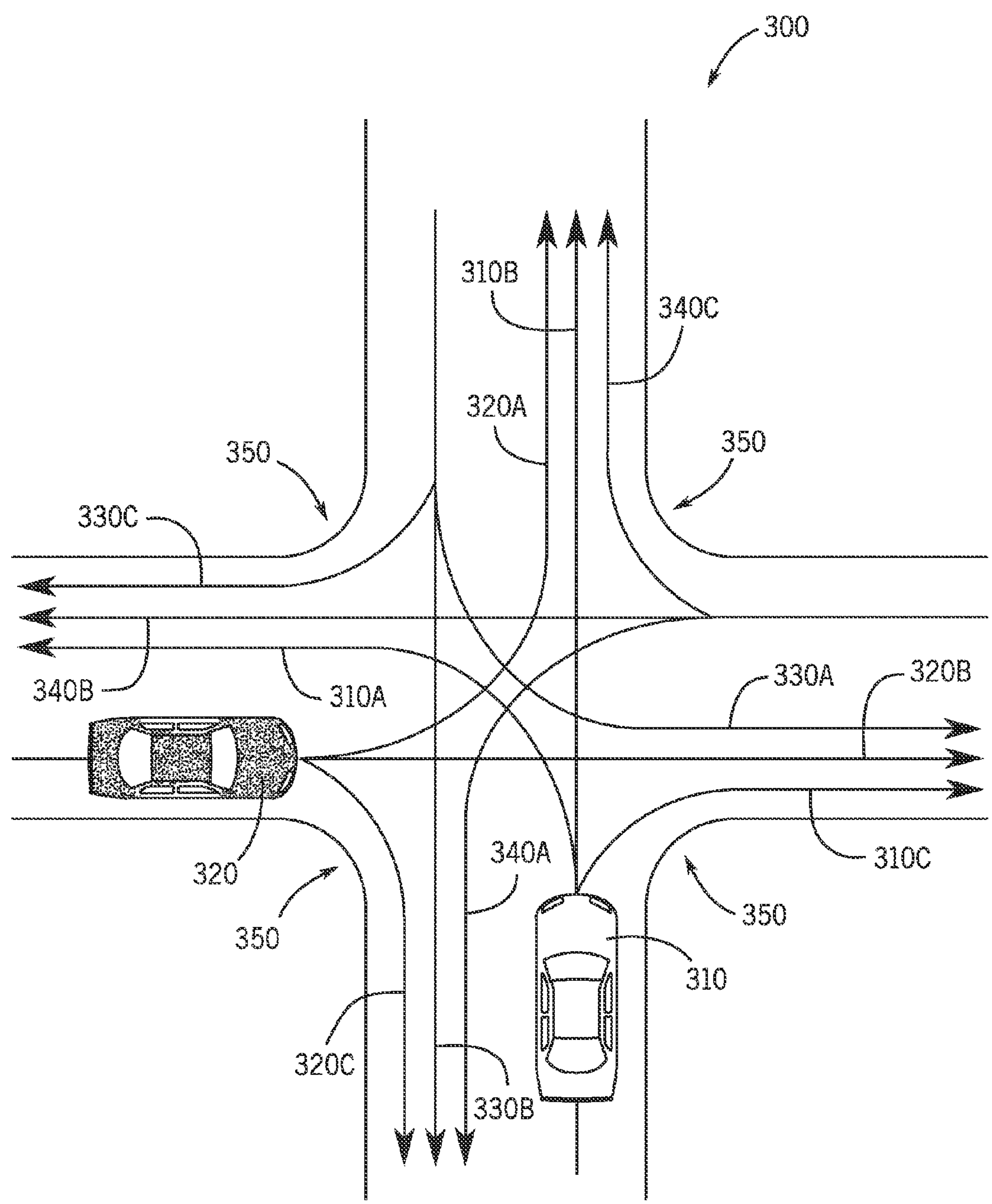
FIG. 3 is an illustration of an example scenario in an operating environment where two vehicles are at an intersection, according to one or more embodiments.

FIG. 3 is an illustration of an example scenario 300 in an operating environment where two vehicles are at an intersection, according to one or more embodiments. As seen in FIG. 3, a variety of possibilities exist when multiple vehicles are at or approaching an intersection. In one or more embodiments, modeling or predictive modeling of one or more vehicles may be used to determine where a driver or a vehicle may travel, should travel, is likely to travel, etc. Here, in FIG. 3, a first vehicle 310 and a second vehicle 320 are present at an intersection 350. Each vehicle at the intersection 350 has one or more different potential travel paths or travel routes. For example, the first vehicle 310 may have a left turn travel path 310A, a straight travel path 310B, and a right turn travel path 310C. Similarly, the second vehicle 320 may have a left turn travel path 320A, a straight travel path 320B, and a right turn travel path 320C. Thus, the left turn travel path 310A of the first vehicle 310 may have a potential collision with the straight travel path 320B or the left turn travel path 320A of the second vehicle 320.

Other travel paths for other vehicles (not shown) are illustrated as well. For example, 330A may be a left turn travel path, 330B may be a straight travel path, and 330C may be a right turn travel path for another vehicle (not shown). Similarly, 340A may be a left turn travel path, 340B may be a straight travel path, and 340C may be a right turn travel path for a different vehicle (not shown).

Figure 4A:
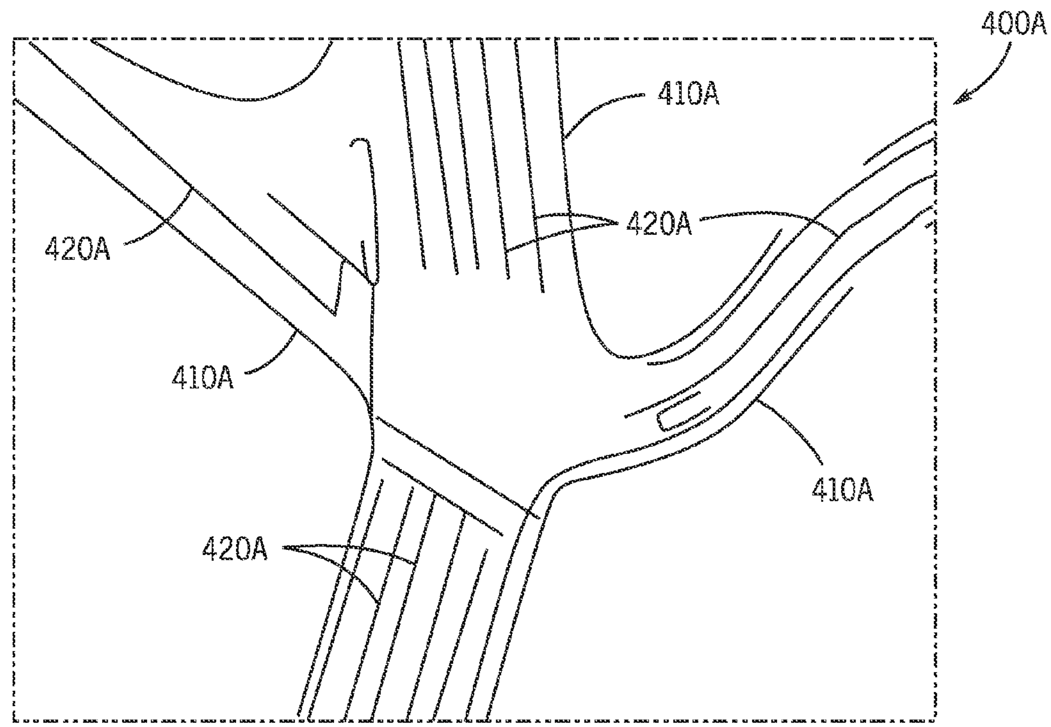
FIGS. 4A-B are illustrations of example graphical representations of environment layout information having lane level detail, according to one or more embodiments.
Figure 4B:
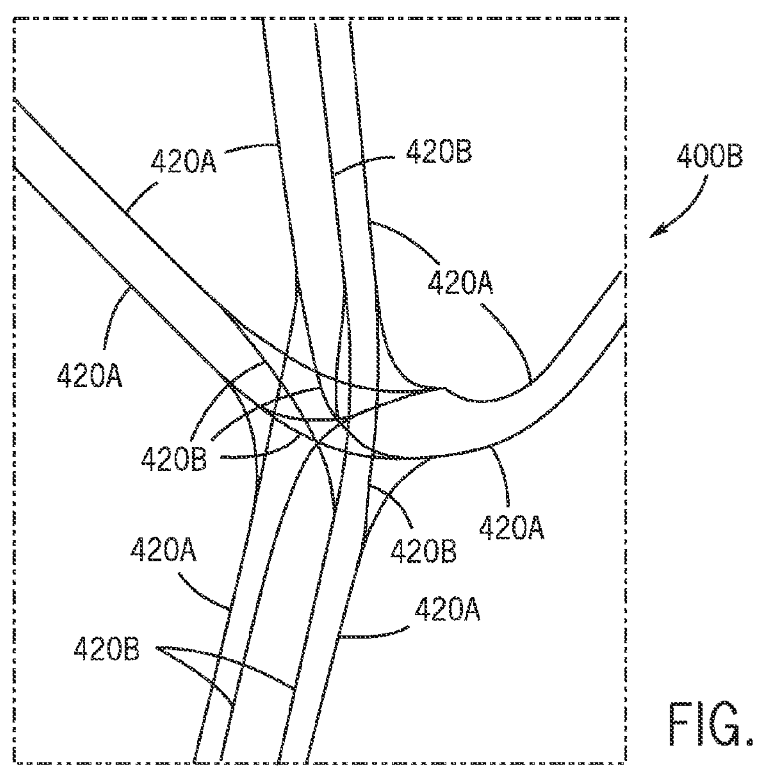

FIGS. 4A-B are illustrations of example graphical representations 400A and 400B of environment layout information having lane level detail, according to one or more embodiments. For example, the environment layout information in FIG. 4A may include general environment layout information 410A which may provide a general contour or shape of a roadway or intersection as a whole, while lane level detail or lane level information 420A may provide additional environment layout information, such as dimensions of a lane, number of lanes, contour or shape of a lane, etc. Similarly, the environment layout information in FIG. 4B may include additional environment layout information 410B which may provide a general contour or shape of a roadway or intersection as a whole, while lane level detail or lane level information 420B may provide additional environment layout information.

In one or more embodiments, the modeling component 130 and prediction component 140 may build models and generate predictions for another vehicle based on observations from a vehicle different than that other vehicle. In other words, predictions associated with a third vehicle may be generated based on observations associated with a second vehicle which was previously at a location associated with the current position of the third vehicle.

Figure 6:
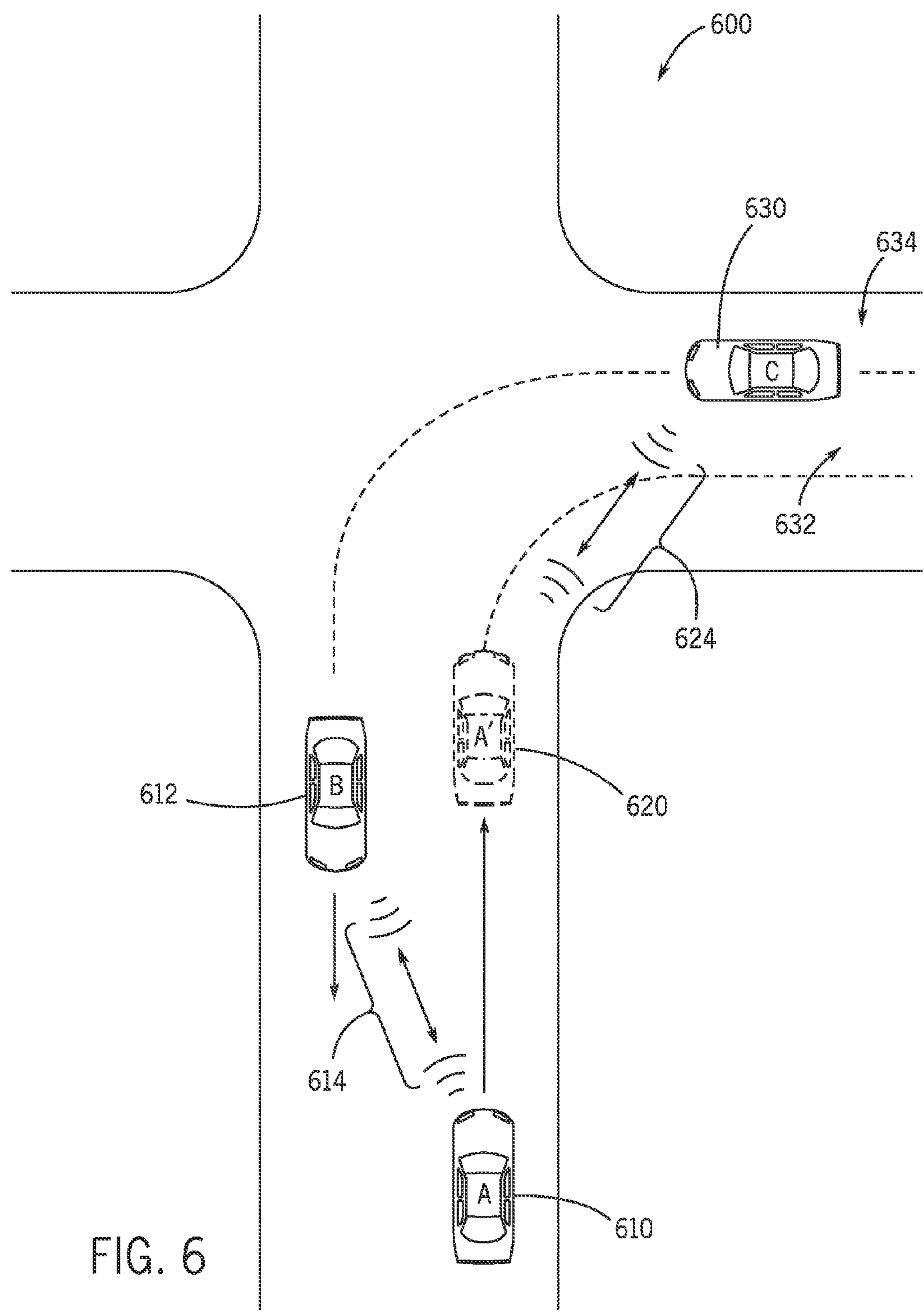
FIG. 6 is an illustration of an example scenario where a vehicle equipped with a system for turn predictions may be used, according to one or more embodiments.

FIG. 6 is an illustration of an example scenario 600 where a vehicle equipped with a system for turn predictions may be used, according to one or more embodiments. Vehicle A (e.g., 610 and 620) may be a vehicle equipped with a system for turn predictions or predictions, and include one or more of the components of the system 100 of FIG. 1. Vehicle B (e.g., 612) may be a vehicle equipped with another or a different system for turn predictions or predictions or have vehicle to vehicle communications capabilities. At a first time, vehicle A (e.g. 610) is approaching an intersection or target area. Here, in this example, vehicle A may not necessarily have a line of sight view of the intersection. A sensor component 110 or a communication component 170 of Vehicle A 610 may detect Vehicle B 612. As indicated by 634, Vehicle B 612 has previously travelled through the intersection. If Vehicle B 612 is equipped with vehicle to vehicle communication functionality or capabilities, environment layout information associated with the intersection or vehicle information associated with the environment layout information may be transmitted 614 from Vehicle B 612 and received by a communication component 170 of Vehicle A 610. In other words, Vehicle B 612 may 'tell' Vehicle A 610 about the intersection. In this way, Vehicle A 610 may receive one or more features of the intersection, environment layout information, or information about how Vehicle B 612 travelled through the intersection (e.g., the speed at which Vehicle B 612 travelled while making the turn at the intersection, the turning radius, the location where the turn was initiated, etc.).

Regardless, Vehicles A and B (610 and 612) may communicate or otherwise exchange environment layout information regarding a target area, such as the intersection, as well as related vehicle information (e.g., velocity or acceleration) associated with the target area (e.g., past location at the intersection) or environment layout information. At a second time, Vehicle A 610 arrives at the intersection, as indicated with Vehicle A' (e.g., 620). Here, at the target area or intersection, Vehicle A' at 620 may detect Vehicle C 630. The modeling component 130 of Vehicle A (610 and 620) may generate a model which includes the intersection (e.g., target area), Vehicle A, and Vehicle C 630. The model may be indicative of an inferred travel path, inferred velocity, etc. for vehicles A' 620 and C 630. The inferred travel path of vehicle A' 620 may be along 632. The inferred travel path of Vehicle C 630 may be similar to the travel path 634 of Vehicle B 612, based on the lane location of Vehicle C 630, for example. Further, the modeling component 130 may build the model to be indicative of an inferred velocity at which Vehicle C 630 may turn, based on vehicle information received from Vehicle B 612 at 614.

In one or more embodiments, when Vehicle C 630 is equipped with vehicle to vehicle communication functionality or capabilities, environment layout information associated with the intersection or vehicle information associated with the environment layout information may be transmitted 624 from Vehicle C 630 and received by the communication component 170 of Vehicle A' 620. Thus, the modeling component 130 and the prediction component 140 of Vehicle A' 620 may build models or generate predictions using this additional data or information. For example, if Vehicle C 630 has its right turn blinker on (e.g., indicating that the driver of Vehicle C 630 desires to change into a right lane), the modeling component 130 of Vehicle A' 620 may thus build a model accordingly.

Figure 7:
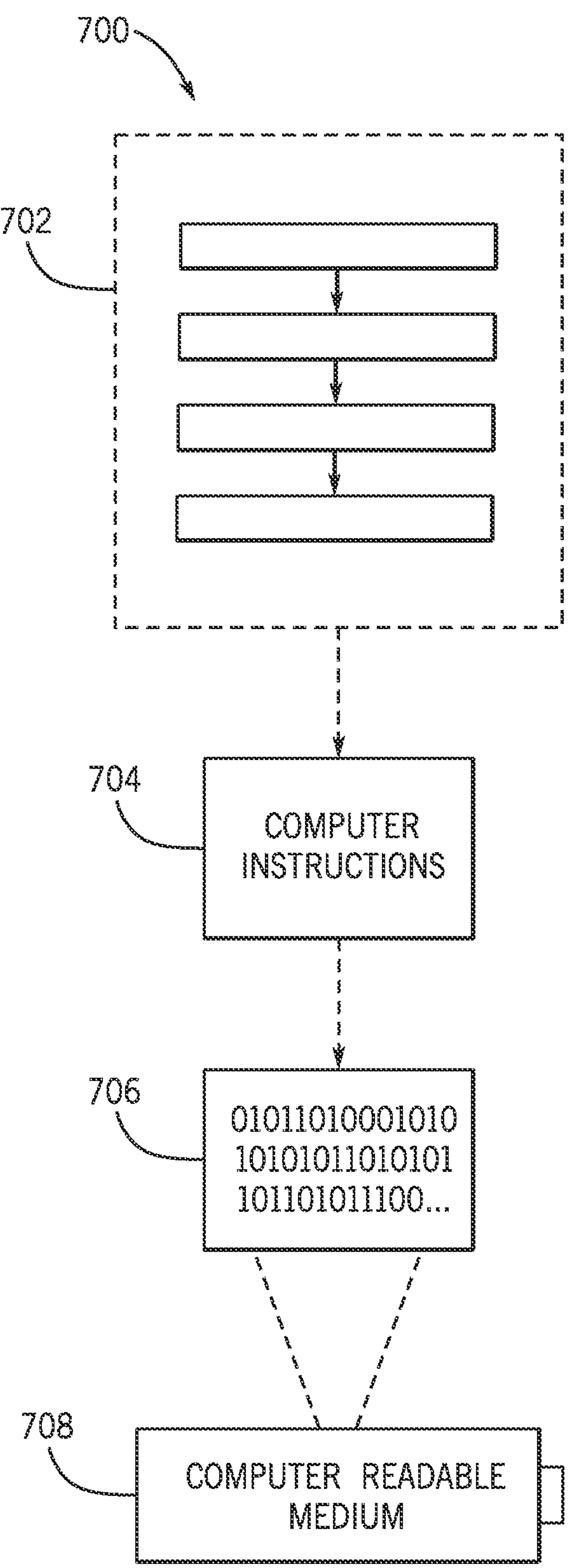
FIG. 7 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This computer-readable data 706, such as binary data including a plurality of zero's and one's as shown in 706, in turn includes a set of computer instructions 704 configured to operate according to one or more of the principles set forth herein. In one such embodiment 700, the processor-executable computer instructions 704 may be configured to perform a method 702, such as the method 200 of FIG. 2. In another embodiment, the processor-executable instructions 704 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
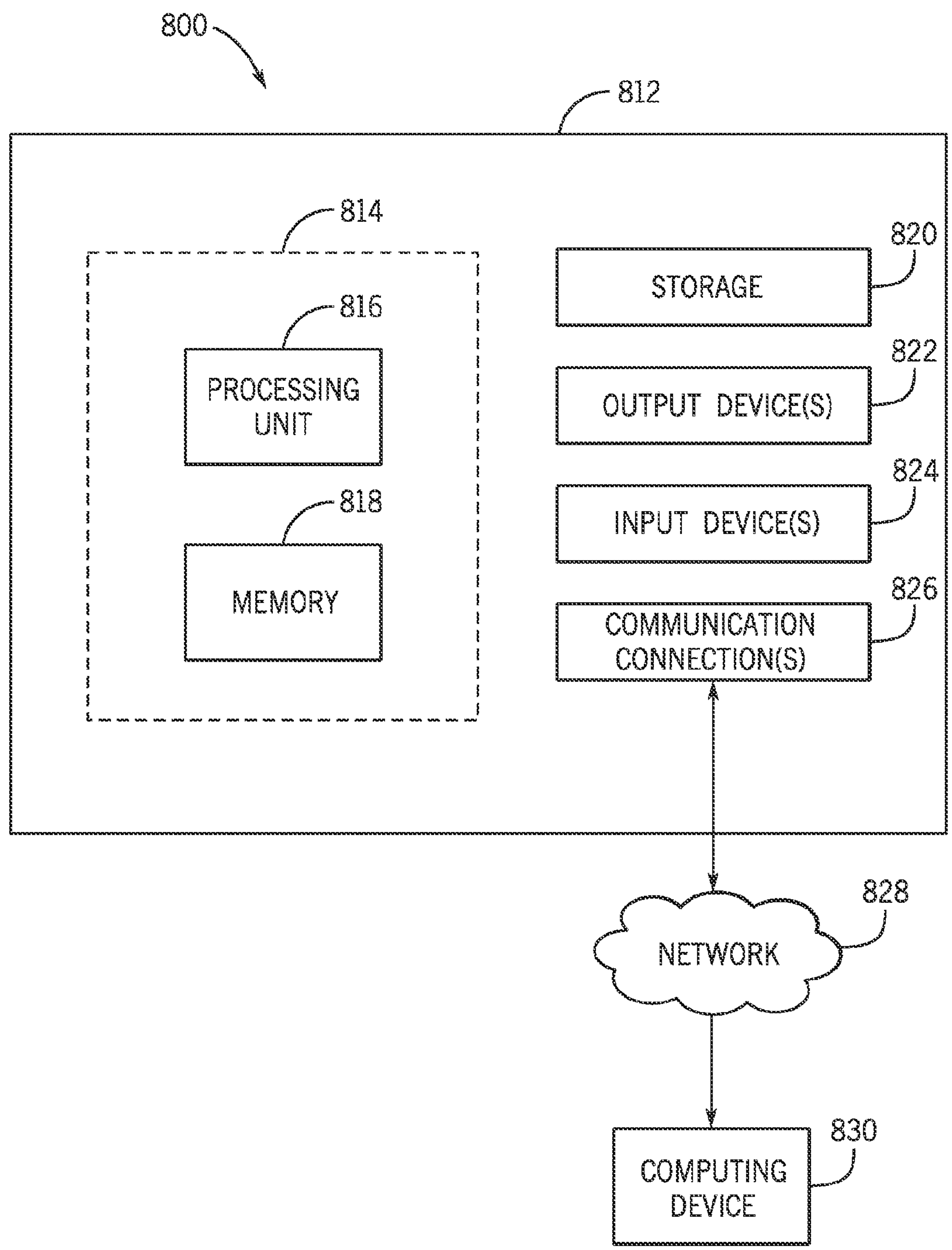
FIG. 8 is an illustration of an example computing environment where one or more of the provisions set forth herein are implemented, according to one or more embodiments.

FIG. 8 and the following discussion provide a description of a suitable computing environment to implement embodiments of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one or more embodiments provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other embodiments, device 812 includes additional features or functionality. For example, device 812 may include additional storage such as removable storage or non-removable storage, including, but not limited to, magnetic storage, optical storage, etc. Such additional storage is illustrated in FIG. 8 by storage 820. In one or more embodiments, computer readable instructions to implement one or more embodiments provided herein are in storage 820. Storage 820 may store other computer readable instructions to implement an operating system, an application program, etc. Computer readable instructions may be loaded in memory 818 for execution by processing unit 816, for example.

The term “computer readable media” as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 812. Any such computer storage media is part of device 812.

The term “computer readable media” includes communication media. Communication media typically embodies computer readable instructions or other data in a “modulated data signal” such as a carrier wave or other transport mechanism and includes any information delivery media. The term “modulated data signal” includes a signal that has one or more of its characteristics set or changed in such a manner as to encode information in the signal.

Device 812 includes input device(s) 824 such as keyboard, mouse, pen, voice input device, touch input device, infrared cameras, video input devices, or any other input device. Output device(s) 822 such as one or more displays, speakers, printers, or any other output device may be included with device 812. Input device(s) 824 and output device(s) 822 may be connected to device 812 via a wired connection, wireless connection, or any combination thereof. In one or more embodiments, an input device or an output device from another computing device may be used as input device(s) 824 or output device(s) 822 for computing device 812. Device 812 may include communication connection(s) 826 to facilitate communications with one or more other devices.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, “or” is intended to mean an inclusive “or” rather than an exclusive “or”. Further, an inclusive “or” may include any combination thereof (e.g., A, B, or any combination thereof). In addition, “a” and “an” as used in this application are generally construed to mean “one or more” unless specified otherwise or clear from context to be directed to a singular form. Additionally, at least one of A and B and/or the like generally means A or B or both A and B. Further, to the extent that “includes”, “having”, “has”, “with”, or variants thereof are used in either the detailed description or the claims, such terms are intended to be inclusive in a manner similar to the term “comprising”.

Further, unless specified otherwise, “first”, “second”, or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, “comprising”, “comprises”, “including”, “includes”, or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for turn predictions, comprising:

a navigation component receiving environment layout information of an operating environment through which a first vehicle is travelling and a current location of the first vehicle, wherein the environment layout information is indicative of a shape of a road segment;

a communication component receiving additional environment layout information directly from one or more of the other vehicles, wherein the additional environment layout information is indicative of the shape of the road segment, and wherein the communication component verifies the additional environment layout information against the environment layout information;

a modeling component building a model including the operating environment, the first vehicle, and one or more of the other vehicles based on the environment layout information and the additional environment layout information, the model indicative of an intent of a driver of one of the one or more other vehicles; and a prediction component generating one or more predictions based on the model, wherein the navigation component, the communication component, and the modeling component are implemented via a processing unit or a memory.

2. The system of claim 1, wherein the environment layout information or the additional environment layout information includes lane level information associated with the operating environment.

3. The system of claim 1, wherein the modeling component builds the model based on a Hidden Markov Model (HMM) where distributions of observations of the HMM are associated with a Gaussian Mixture Model (GMM).

4. The system of claim 1, wherein:

the communication component receives vehicle information from one or more of the other vehicles; and the modeling component builds the model based on the vehicle information of one or more of the other vehicles.

5. The system of claim 1, comprising a sensor component receiving environmental layout information, wherein the modeling component builds the model based on the environment layout information.

6. The system of claim 1, wherein the prediction component generates a time-to-collision (TTC) prediction, a collision prediction, or a turn prediction.

7. The system of claim 1, comprising a mapping component providing information related to a number of lanes of a roadway, geometry of lanes at an intersection, or legal directions of motion from a lane based on one or more of the predictions and one or more traffic rules.

8. The system of claim 1, comprising an assist component determining one or more assist actions based on one or more of the predictions.

9. The system of claim 1, wherein the environment layout information or additional environment layout information includes number of lanes.

10. The system of claim 1, wherein the navigation component determines an intended travel path for the first vehicle based on a destination location and one or more of the predictions for one or more of the other vehicles indicative of motion of respective other vehicles.

11. A method for turn predictions, comprising:

receiving environment layout information of an operating environment through which a first vehicle is travelling and a current location of the first vehicle, wherein the environment layout information is indicative of a shape of a road segment;

detecting one or more other vehicles;

receiving additional environment layout information directly from one or more of the other vehicles, wherein the additional environment layout information is indicative of the shape of the road segment, and verifying the additional environment layout information against the environment layout information;

building a model including the operating environment, the first vehicle, and one or more of the other vehicles based on the environment layout information and the additional environment layout information, the model indicative of an intent of a driver of one of the one or more other vehicles;

generating one or more predictions based on the model; and rendering one or more of the predictions.

12. The method of claim 11, wherein the environment layout information or the additional environment layout information includes lane level information associated with the operating environment.

13. The method of claim 11, wherein building the model is based on a Hidden Markov Model (HMM) where distributions of observations of the HMM are associated with a Gaussian Mixture Model (GMM).

14. The method of claim 11, comprising:

receiving vehicle information from one or more of the other vehicles; and building the model based on the vehicle information of one or more of the other vehicles.

15. The method of claim 11, comprising:

receiving environmental layout information from a sensor; and building the model based on the environment layout information from the sensor.

16. The method of claim 11, comprising generating a time-to-collision (TTC) prediction, a collision prediction, or a turn prediction.

17. A system for turn predictions, comprising:

a navigation component receiving environment layout information of an operating environment through which a first vehicle is travelling and a current location of the first vehicle, wherein the environment layout information includes lane level information associated with the operating environment, a shape of a lane of a roadway within the operating environment, or a number of lanes of a roadway within the operating environment;

a sensor component detecting one or more other vehicles;

a communication component receiving additional environment layout information directly from one or more of the other vehicles, wherein the additional environment layout information is indicative of the lane of the roadway within the operating environment and wherein the communication component verifies the additional environment layout information against the environment layout information;

a modeling component building a model including the operating environment, the first vehicle, and one or more of the other vehicles based on the environment layout information and the additional environment layout information, the model indicative of an intent of a driver of one of the one or more other vehicles; and a prediction component generating one or more predictions based on the model, wherein the navigation component, the communication component, and the modeling component are implemented via a processing unit or a memory.

18. The system of claim 17, wherein the modeling component builds the model based on a Hidden Markov Model (HMM) where distributions of observations of the HMM are associated with a Gaussian Mixture Model (GMM).

19. The system of claim 17, wherein the prediction component generates a time-to-collision (TTC) prediction, a collision prediction, or a turn prediction.

20. The system of claim 17, wherein the navigation component determines an intended travel path for the first vehicle based on a destination location and one or more of the predictions for one or more of the other vehicles indicative of motion of respective other vehicles.

* * * * *